US 8,935,715 B2

(12) United States Patent
Cibula et al.

(10) Patent No.: US 8,935,715 B2
(45) Date of Patent: *Jan. 13, 2015

(54) METHOD OF AND APPARATUS FOR UTILIZING SMS WHILE RUNNING AN APPLICATION ON A MOBILE DEVICE CONTROLLING A VIEWER'S PARTICIPATION WITH A BROADCAST

(71) Applicant: Winview, Inc., Redwood City, CA (US)

(72) Inventors: Michael Cibula, San Francisco, CA (US); Mark K. Berner, Santa Clara, CA (US); David B. Lockton, Carmel, CA (US)

(73) Assignee: Winview, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/274,706

(22) Filed: May 10, 2014

(65) Prior Publication Data
US 2014/0248952 A1 Sep. 4, 2014

Related U.S. Application Data

(63) Continuation of application No. 12/288,768, filed on Oct. 22, 2008, now Pat. No. 8,813,112.

(60) Provisional application No. 61/000,179, filed on Oct. 23, 2007.

(51) Int. Cl.
H04N 7/173 (2011.01)
A63F 13/00 (2014.01)
H04W 4/14 (2009.01)

(52) U.S. Cl.
CPC . *A63F 13/00* (2013.01); *H04W 4/14* (2013.01)
USPC .......................................... 725/24

(58) Field of Classification Search
None
See application file for complete search history.

(56) References Cited

U.S. PATENT DOCUMENTS

| 4,141,548 A | 2/1979 | Everton |
| 4,270,755 A | 6/1981 | Willhide et al. |

(Continued)

FOREIGN PATENT DOCUMENTS

| CA | 2252021 | 11/1998 |
| CA | 2252074 | 11/1998 |

(Continued)

OTHER PUBLICATIONS

"Two Way TV Patent and Filing Map" www.twowaytv.com/version4/technologies/tech_patents.asp.

(Continued)

*Primary Examiner* — Fernando Alcon
(74) *Attorney, Agent, or Firm* — Haverstock & Owens LLP

(57) ABSTRACT

An improved method of and system for participating in SMS-TV contests enables a user to utilize one or more applications to perform desired operations such as using the user interface to efficiently make selections to respond to a question in a contest, downloading SMS short codes, promoting contests within the application, storing a history of SMS-TV programs, enabling an alternate phone number to be submitted, utilizing user identification tags, disconnecting the application to receive an incoming call, verification, contacting a server to send an SMS message on the device's behalf and other operations. Some of the aforementioned operations are performed by the user specifically while others are automatically performed by a server to provide the user with the best service possible.

52 Claims, 8 Drawing Sheets

(56) References Cited

U.S. PATENT DOCUMENTS

| | | |
|---|---|---|
| 4,496,148 A | 1/1985 | Morstain et al. |
| 4,592,546 A | 6/1986 | Fascenda et al. |
| 4,816,904 A | 3/1989 | McKenna et al. |
| 5,013,038 A | 5/1991 | Luvenberg |
| 5,035,422 A | 7/1991 | Berman |
| 5,073,931 A | 12/1991 | Audebert et al. |
| 5,083,271 A | 1/1992 | Thacher et al. |
| 5,083,800 A | 1/1992 | Lockton |
| 5,120,076 A | 6/1992 | Luxenberg et al. |
| 5,213,337 A | 5/1993 | Sherman |
| 5,227,874 A | 7/1993 | Von Kohorn |
| 5,263,723 A | 11/1993 | Pearson et al. |
| 5,283,734 A | 2/1994 | Von Kohorn |
| 5,343,236 A | 8/1994 | Koppe et al. |
| 5,343,239 A | 8/1994 | Lappington et al. |
| 5,462,275 A | 10/1995 | Lowe et al. |
| 5,479,492 A | 12/1995 | Hofstee et al. |
| 5,553,120 A | 9/1996 | Katz |
| 5,566,291 A | 10/1996 | Boulton et al. |
| 5,585,975 A | 12/1996 | Bliss |
| 5,586,257 A | 12/1996 | Perlman |
| 5,589,765 A | 12/1996 | Ohmart et al. |
| 5,643,088 A | 7/1997 | Vaughn et al. |
| 5,759,101 A | 6/1998 | Von Kohorn |
| 5,761,606 A | 6/1998 | Wolzien |
| 5,762,552 A | 6/1998 | Vuong et al. |
| 5,764,275 A | 6/1998 | Lappington et al. |
| 5,813,913 A | 9/1998 | Berner et al. |
| 5,838,774 A | 11/1998 | Weisser, Jr. |
| 5,860,862 A | 1/1999 | Junkin |
| 5,870,683 A | 2/1999 | Wells et al. |
| 5,916,024 A | 6/1999 | Von Kohorn |
| 5,970,143 A | 10/1999 | Schneier et al. |
| 5,971,854 A | 10/1999 | Pearson et al. |
| 5,987,440 A | 11/1999 | O'Neil et al. |
| 6,016,337 A | 1/2000 | Pykalisto |
| 6,117,013 A | 9/2000 | Elba |
| 6,126,543 A | 10/2000 | Friedman |
| 6,174,237 B1 | 1/2001 | Stephenson |
| 6,182,084 B1 | 1/2001 | Cockrell et al. |
| 6,193,610 B1 | 2/2001 | Junkin |
| 6,222,642 B1 | 4/2001 | Farrell et al. |
| 6,233,736 B1 | 5/2001 | Wolzien |
| 6,251,017 B1 | 6/2001 | Leason et al. |
| 6,293,868 B1 | 9/2001 | Bernard |
| 6,312,336 B1 | 11/2001 | Handelman et al. |
| 6,411,969 B1 | 6/2002 | Tam |
| 6,416,414 B1 | 7/2002 | Stadelmann |
| 6,425,828 B2 | 7/2002 | Walker et al. |
| 6,434,398 B1 | 8/2002 | Inselberg |
| 6,470,180 B1 | 10/2002 | Kotzin et al. |
| 6,524,189 B1 | 2/2003 | Rautila |
| 6,530,082 B1 | 3/2003 | Del Sesto et al. |
| 6,578,068 B1 | 6/2003 | Bowman-Amuah |
| 6,594,098 B1 | 7/2003 | Sutardja |
| 6,604,997 B2 | 8/2003 | Saidakovsky et al. |
| 6,610,953 B1 | 8/2003 | Tao et al. |
| 6,648,760 B1 | 11/2003 | Nicastro |
| 6,659,860 B1 | 12/2003 | Yamamoto et al. |
| 6,659,872 B1 | 12/2003 | Kaufman et al. |
| 6,690,661 B1 | 2/2004 | Agarwal et al. |
| 6,718,350 B1 | 4/2004 | Karbowski |
| 6,752,396 B2 | 6/2004 | Smith |
| 6,758,754 B1 | 7/2004 | Lavanchy et al. |
| 6,758,755 B2 | 7/2004 | Kelly et al. |
| 6,760,595 B2 | 7/2004 | Inselberg |
| 6,763,377 B1 | 7/2004 | Balknap et al. |
| 6,774,926 B1 | 8/2004 | Ellis et al. |
| 6,785,561 B1 | 8/2004 | Kim |
| 6,801,380 B1 | 10/2004 | Sutardja |
| 6,807,675 B1 | 10/2004 | Maillard et al. |
| 6,811,482 B2 | 11/2004 | Letovsky |
| 6,817,947 B2 | 11/2004 | Tanskanen |
| 6,824,469 B2 | 11/2004 | Allibhoy et al. |
| 6,840,861 B2 | 1/2005 | Jordan et al. |
| 6,846,239 B2 | 1/2005 | Washio |
| 6,857,122 B1 | 2/2005 | Takeda et al. |
| 6,863,610 B2 | 3/2005 | Vancraeynest |
| 6,871,226 B1 | 3/2005 | Ensley et al. |
| 6,873,610 B1 | 3/2005 | Noever |
| 6,884,172 B1 | 4/2005 | Lloyd et al. |
| 6,887,159 B2 | 5/2005 | Leen et al. |
| 6,893,347 B1 | 5/2005 | Zilliacus et al. |
| 6,942,574 B1 | 9/2005 | LeMay et al. |
| 6,960,088 B1 | 11/2005 | Long |
| 7,035,653 B2 | 4/2006 | Simon et al. |
| 7,116,310 B1 | 10/2006 | Evans et al. |
| 7,125,336 B2 | 10/2006 | Anttila et al. |
| 7,169,050 B1 | 1/2007 | Tyler |
| 7,192,352 B2 | 3/2007 | Walker et al. |
| 7,194,758 B1 | 3/2007 | Waki et al. |
| 7,254,605 B1 | 8/2007 | Strum |
| 7,288,027 B2 | 10/2007 | Overton |
| 7,347,781 B2 | 3/2008 | Schultz |
| 7,351,149 B1 | 4/2008 | Simon et al. |
| 7,379,705 B1 | 5/2008 | Rados et al. |
| 7,502,610 B2 | 3/2009 | Maher |
| 7,517,282 B1 | 4/2009 | Pryor |
| 7,562,134 B1 | 7/2009 | Fingerhut et al. |
| 7,630,986 B1 | 12/2009 | Herz et al. |
| 7,907,211 B2 | 3/2011 | Oostveen et al. |
| 8,006,314 B2 | 8/2011 | Wold |
| 8,082,150 B2 | 12/2011 | Wold |
| 8,086,445 B2 | 12/2011 | Wold et al. |
| 8,107,674 B2 | 1/2012 | Davis et al. |
| 8,176,518 B1 | 5/2012 | Junkin et al. |
| 2001/0004609 A1 | 6/2001 | Walker et al. |
| 2001/0005670 A1 | 6/2001 | Lahtinen |
| 2001/0020298 A1 | 9/2001 | Rector, Jr. et al. |
| 2002/0010789 A1 | 1/2002 | Lord |
| 2002/0042293 A1 | 4/2002 | Ubale et al. |
| 2002/0054088 A1 | 5/2002 | Tanskanen et al. |
| 2002/0056089 A1 | 5/2002 | Houston |
| 2002/0059623 A1 | 5/2002 | Rodriguez et al. |
| 2002/0078176 A1 | 6/2002 | Nomura et al. |
| 2002/0103696 A1 | 8/2002 | Huang et al. |
| 2002/0108125 A1 | 8/2002 | Joao |
| 2002/0108127 A1 | 8/2002 | Lew et al. |
| 2002/0124247 A1 | 9/2002 | Houghton |
| 2002/0132614 A1 | 9/2002 | Vanluijt et al. |
| 2002/0157002 A1 | 10/2002 | Messerges et al. |
| 2002/0159576 A1 | 10/2002 | Adams |
| 2002/0162031 A1 | 10/2002 | Levin et al. |
| 2002/0177483 A1 | 11/2002 | Cannon |
| 2003/0013528 A1 | 1/2003 | Allibhoy et al. |
| 2003/0040363 A1 | 2/2003 | Sandberg |
| 2003/0069828 A1 | 4/2003 | Blazey et al. |
| 2003/0070174 A1 | 4/2003 | Solomon |
| 2003/0078924 A1 | 4/2003 | Liechty et al. |
| 2003/0086691 A1 | 5/2003 | Yu |
| 2003/0087652 A1 | 5/2003 | Simon et al. |
| 2003/0114224 A1 | 6/2003 | Anttila et al. |
| 2003/0144017 A1 | 7/2003 | Inselberg |
| 2003/0154242 A1 | 8/2003 | Hayes et al. |
| 2003/0177504 A1 | 9/2003 | Paulo et al. |
| 2003/0195023 A1 | 10/2003 | Di Cesare |
| 2003/0211856 A1 | 11/2003 | Zilliacus |
| 2003/0212691 A1 | 11/2003 | Kuntala et al. |
| 2003/0216185 A1 | 11/2003 | Varley |
| 2003/0216857 A1 | 11/2003 | Feldman et al. |
| 2004/0014524 A1 | 1/2004 | Pearlman |
| 2004/0022366 A1 | 2/2004 | Ferguson et al. |
| 2004/0060063 A1 | 3/2004 | Russ et al. |
| 2004/0088729 A1 | 5/2004 | Petrovic et al. |
| 2004/0093302 A1 | 5/2004 | Baker et al. |
| 2004/0117831 A1 | 6/2004 | Ellis et al. |
| 2004/0117839 A1 | 6/2004 | Watson et al. |
| 2004/0128319 A1 | 7/2004 | Davis et al. |
| 2004/0148638 A1 | 7/2004 | Weisman et al. |
| 2004/0152454 A1 | 8/2004 | Kauppinen |
| 2004/0158855 A1 | 8/2004 | Gu et al. |
| 2004/0178923 A1 | 9/2004 | Kuang |
| 2004/0198495 A1 | 10/2004 | Cisneros et al. |
| 2004/0203667 A1 | 10/2004 | Schroeder et al. |

(56) References Cited

U.S. PATENT DOCUMENTS

| | | |
|---|---|---|
| 2004/0203898 A1 | 10/2004 | Bodin et al. |
| 2004/0224750 A1 | 11/2004 | Al-Ziyoud |
| 2004/0242321 A1 | 12/2004 | Overton |
| 2005/0026699 A1 | 2/2005 | Kinzer et al. |
| 2005/0060219 A1 | 3/2005 | Deitering et al. |
| 2005/0076371 A1 | 4/2005 | Nakamura |
| 2005/0097599 A1 | 5/2005 | Plotnick et al. |
| 2005/0101309 A1 | 5/2005 | Croome |
| 2005/0113164 A1 | 5/2005 | Buecheler et al. |
| 2005/0131984 A1 | 6/2005 | Hofmann et al. |
| 2005/0210526 A1 | 9/2005 | Levy et al. |
| 2005/0235043 A1 | 10/2005 | Teodosiu et al. |
| 2005/0255901 A1 | 11/2005 | Kreutzer |
| 2005/0266869 A1 | 12/2005 | Jung |
| 2005/0273804 A1 | 12/2005 | Preisman |
| 2005/0288812 A1 | 12/2005 | Cheng et al. |
| 2006/0025070 A1 | 2/2006 | Kim et al. |
| 2006/0047772 A1 | 3/2006 | Crutcher |
| 2006/0059161 A1 | 3/2006 | Millett et al. |
| 2006/0089199 A1 | 4/2006 | Jordan et al. |
| 2006/0135253 A1 | 6/2006 | George et al. |
| 2006/0148569 A1 | 7/2006 | Beck |
| 2006/0156371 A1 | 7/2006 | Maetz et al. |
| 2006/0174307 A1 | 8/2006 | Hwang et al. |
| 2006/0205483 A1 | 9/2006 | Meyer et al. |
| 2006/0248553 A1 | 11/2006 | Mikkelson et al. |
| 2006/0269120 A1 | 11/2006 | Mehmadi et al. |
| 2007/0004516 A1 | 1/2007 | Jordan et al. |
| 2007/0019826 A1 | 1/2007 | Horbach et al. |
| 2007/0083920 A1 | 4/2007 | Mizoguchi et al. |
| 2007/0106721 A1 | 5/2007 | Schloter |
| 2007/0174870 A1 | 7/2007 | Nagashima et al. |
| 2007/0226062 A1 | 9/2007 | Hughes et al. |
| 2007/0238525 A1 | 10/2007 | Suomela |
| 2007/0243936 A1 | 10/2007 | Binenstock et al. |
| 2007/0244570 A1 | 10/2007 | Speiser et al. |
| 2007/0244585 A1 | 10/2007 | Speiser et al. |
| 2007/0244749 A1 | 10/2007 | Speiser et al. |
| 2008/0076497 A1 | 3/2008 | Kiskis et al. |
| 2008/0270288 A1 | 10/2008 | Butterly et al. |
| 2008/0288600 A1 | 11/2008 | Clark |
| 2009/0163271 A1 | 6/2009 | George et al. |
| 2009/0234674 A1 | 9/2009 | Wurster |
| 2010/0099421 A1 | 4/2010 | Patel et al. |
| 2010/0099471 A1 | 4/2010 | Feeney et al. |
| 2013/0005453 A1 | 1/2013 | Nguyen et al. |

FOREIGN PATENT DOCUMENTS

| | | |
|---|---|---|
| CA | 2279069 | 7/1999 |
| CA | 2287617 | 10/1999 |
| EP | 0649102 A3 | 6/1996 |
| GB | 2364485 | 1/2002 |
| JP | 11-46356 | 2/1999 |
| JP | 11-239183 | 8/1999 |
| JP | 2000-165840 | 6/2000 |
| JP | 2000-217094 | 8/2000 |
| JP | 2000-358255 | 12/2000 |
| JP | 2001-28743 | 1/2001 |
| JP | 2000-209563 | 7/2008 |
| NZ | 330242 | 10/1998 |
| WO | 01/65743 A1 | 9/2001 |
| WO | 02/003698 A1 | 10/2002 |

OTHER PUBLICATIONS

"Ark 4.0 Standard Edition, Technical Overview" www.twowaytv.com/version4/technologies/tech_ark_professional.asp.

"Understanding the Interactivity Between Television and Mobile Commerce", Robert Davis and David Yung, Communications of the ACM, Jul. 2005, vol. 48, No. 7, pp. 103-105.

"Re: Multicast Based Voting System" www.ripe.net/ripe/maillists/archives/mbone-eu-op/1997/msg00100html.

"IST and Sportal.com: Live on the Internet Sep. 14, 2004 by Clare Spoonheim", www.isk.co.usk/NEWS/dotcom/ist_sportal.html.

"Modelling User Behavior in Networked Games by Tristan Henderson and Saleem Bhatti", www.woodworm.cs.uml.edu/rprice/ep/henderson.

"SMS Based Voting and Survey System for Meetings", www.abbit.be/technology/SMSSURVEY.html.

"PurpleAce Launches 3GSM Ringtone Competition", www.wirelessdevnet.com/news/2005/jan/31/news6html.

"On the Performance of Protocols for collecting Responses over a Multiple-Access Channel", Mostafa H. Ammar and George N. Rouskas, IEEE INFORCOM '91, pp. 1490-1499, vol. 3, IEEE, New York, NY.

Merriam-Webster, "Game" definition, <http://www.merriam-webstercom/dictionary/agme>p. 1.

Ducheneaut et al., "The Social Side of Gaming: A Study of Interaction Patterns in a Massively Multiplayer Online Game", Palo Alto Research Center, Nov. 2004, vol. 6, Issue 4, pp. 360-369.

METHOD OF AND APPARATUS FOR UTILIZING SMS WHILE RUNNING AN APPLICATION ON A MOBILE DEVICE CONTROLLING A VIEWER'S PARTICIPATION WITH A BROADCAST

This Patent Application is a continuation of co-pending U.S. patent application Ser. No. 12/288,768, filed on Oct. 22, 2008, entitled A METHOD OF AND APPARATUS FOR UTILEZING SMS WHILE RUNNING AN APPLICATION ON A MOBILE DEVICE CONTROLLING A VIEWER'S PARTICIPATION WITH A BROADCAST which claims priority under 35 U.S.C. §119(e) of the co-owned U.S. Provisional Patent Application No. 61/000,179, filed Oct. 23, 2007, and entitled "A METHOD OF AND APPARATUS FOR UTILIZING SMS WHILE RUNNING AN APPLICATION ON A MOBILE DEVICE CONTROLLING A VIEWER'S PARTICIPATION WITH A BROADCAST" which are also both hereby incorporated by reference in their entirety.

FIELD OF THE INVENTION

The present invention relates to the field of distributed gaming. More specifically, the present invention relates to the field of distributed gaming utilizing a mobile device.

BACKGROUND OF THE INVENTION

"Play along TV" describes the act of television viewers playing along with TV shows or interacting with TV shows. Examples of play along TV programs include predicting outcomes of live events, such as predicting the plays watching an NFL telecast, voting for a favorite performance and answering trivia questions about a particular television program. Participation TV programs are able to be run on many types of devices, including cable/satellite set top boxes (via on-screen overlays and using a remote control to make selections), telephones (via calling a specified phone number), computers (via software programs or Web browser-based applications) and SMS, a mobile phone messaging protocol that stands for Short Messaging Service. SMS is a messaging standard integrated into most mobile/cell phones that limits messages to 160 characters. SMS-TV refers to play along TV programs that utilize SMS as a means of submitting entries and/or responses. For example, while watching a telecast of Deal or No Deal, viewers might have the opportunity to participate in The Lucky Case Game. Viewers are asked to accurately guess in which suitcase (numbered one through six) a cash prize is located. Viewers choosing to participate, send an SMS with the number of their case selection to an address, which is an SMS short code, displayed on the TV screen. The contest provider receives the SMS message with the text entered by the participant, along with the participant's mobile phone number, which is automatically included as part of the SMS protocol. If the viewer accurately predicts the correct case, they are entered into a random drawing to win a cash prize. Once the list of potential winners is generated, they are contacted via telephone in order to verify their eligibility. Other examples of play along TV programs include:

Voting for a favorite contestant on a television show like American Idol or a pair of dancers on Dancing with the Stars;
Answering multiple choice questions, which could include trivia, recall questions, or predictions about upcoming events that will take place during the program;
Responding to an opinion poll related to the telecast;
Predicting the outcome of an at bat in a baseball game or the play that will be called in football; or
Solving the mystery on a crime based TV program.

SUMMARY OF THE INVENTION

An improved method of and system for participating in SMS-TV contests enables a user to utilize one or more applications to perform desired operations such as using the user interface to efficiently make selections to respond to a question in a contest, downloading SMS short codes, promoting contests within the application, storing a history of SMS-TV programs, enabling an alternate phone number to be submitted, utilizing user identification tags, disconnecting the application to receive an incoming call, verification, contacting a server to send an SMS message on the device's behalf and other operations. Some of the aforementioned operations are performed by the user specifically while others are automatically performed by a server to provide the user with the best service possible.

In one aspect, a method implemented on a computing device of providing an improved user experience when participating in a Short Messaging Service television (SMS-TV) contest comprises implementing an application containing a user interface, promoting the SMS-TV contest through the user interface and notifying a winner of the contest. The user interface includes at least one of a list or a set of icons. A user submits a response by highlighting and selecting a choice from the list or the set of icons. The method further comprises storing a history of SMS-TV programs wherein the history of SMS TV programs enables a user to review missed programs. Notifying the winner includes contacting an alternate phone number. The alternate phone number is embedded in an SMS message. The method further comprises disconnecting a data connection of the application to allow incoming calls. Disconnecting a data connection comprises determining which applications to disconnect, sending a message to the applications to terminate the data connection and providing an explanation to users of the disconnected applications. Determining which applications to disconnect comprises disconnecting applications of the users who made a correct selection. Determining which applications to disconnect comprises disconnecting applications of the users who are potential winners. The method further comprises verifying qualifications of the winner through the application. Verifying qualifications occurs before the contest begins. The method further comprises sending an SMS message on behalf of a user utilizing the application and a server. The SMS message is tagged with a unique identifier indicating that the SMS message did not come directly from a user's device. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a computing device for providing an improved user experience when participating in a Short Messaging Service television (SMS-TV) contest comprises a server and a device coupled to the server, the device containing an application configured for implementing a user interface, promoting the SMS-TV contest through the user interface and notifying a winner of the contest. The user interface includes at least one of a list or a set of icons. A user submits a response by highlighting and selecting a choice from the list or the set of icons. The application is further configured for storing a history of SMS-TV programs wherein the history of SMS TV programs enables a user to review missed programs. Notifying the winner includes contacting an alternate phone number. The alternate phone number is embedded in an SMS message. The application is further configured for disconnecting a data connection of the application to allow incoming calls. Disconnecting a data connection comprises determining which applications to disconnect, sending a message to the applications to terminate the data connection and providing an explanation to users of the disconnected applications. Determining which applications to disconnect comprises disconnecting applications of the users who made a correct selection. Determining which applications to disconnect comprises disconnecting applications of the users who are potential winners. The application is further configured for verifying qualifications of the winner. Verifying qualifications occurs before the contest begins. The application is further configured for sending an SMS message on behalf of a user utilizing a server. The SMS message is tagged with a unique identifier indicating that the SMS message did not come directly from a user's device. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system implemented on a computing device, the system comprises a user experience module configured for providing a user interface, an in-application promotion module operatively coupled to the user experience module, the in-application promotion module configured for promoting a contest, a history of Short Messaging Service television (SMS-TV) programs module operatively coupled to the in-application promotion module, the history of SMS-TV programs module configured for presenting a history of television programs and a winner notification module operatively coupled to the SMS-TV programs module, the winner notification module configured for notifying a winner. The system further comprises an SMS-TV entry module operatively coupled to the winner notification module, the SMS-TV entry module configured for communicating with a server to send an SMS message. The winner notification module is further configured for disconnecting a data connection of the application to allow incoming calls. The winner notification module is further configured for verifying qualifications of the winner. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In yet another aspect, a device comprises a memory for storing an application, the application configured for implementing a user interface, promoting the Short Messaging Service television (SMS-TV) contest through the user interface and notifying a winner of the contest and a processing component coupled to the memory, the processing component configured for processing the application. The user interface includes at least one of a list or a set of icons. A user submits a response by highlighting and selecting a choice from the list or the set of icons. Notifying a winner includes disconnecting a data connection of the application to allow incoming calls. Notifying the winner includes verifying qualifications of the winner. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a server device comprises a memory for storing an application, the application configured for promoting contests through a user-side application, storing a history of Short Messaging Service television (SMS-TV) programs to be presented on a user device and notifying a winner of a contest and a processing component coupled to the memory, the processing component configured for processing the application. Notifying a winner includes contacting an alternate phone number supplied by the user device. Notifying a winner includes disconnecting the user-side application so that the user device is able receive an incoming call. The application is further configured for verifying user credentials. The application is further configured for sending an SMS message on the user device's behalf.

In another aspect, a network of devices comprises at least one server, a plurality of mobile devices, each of the plurality of mobile devices containing an application configured for implementing a user interface, promoting the SMS-TV contest through the user interface and notifying a winner of the contest and a network for coupling the at least one server and the plurality of mobile devices.

DETAILED DESCRIPTION OF THE PREFERRED EMBODIMENT

Figure 1:
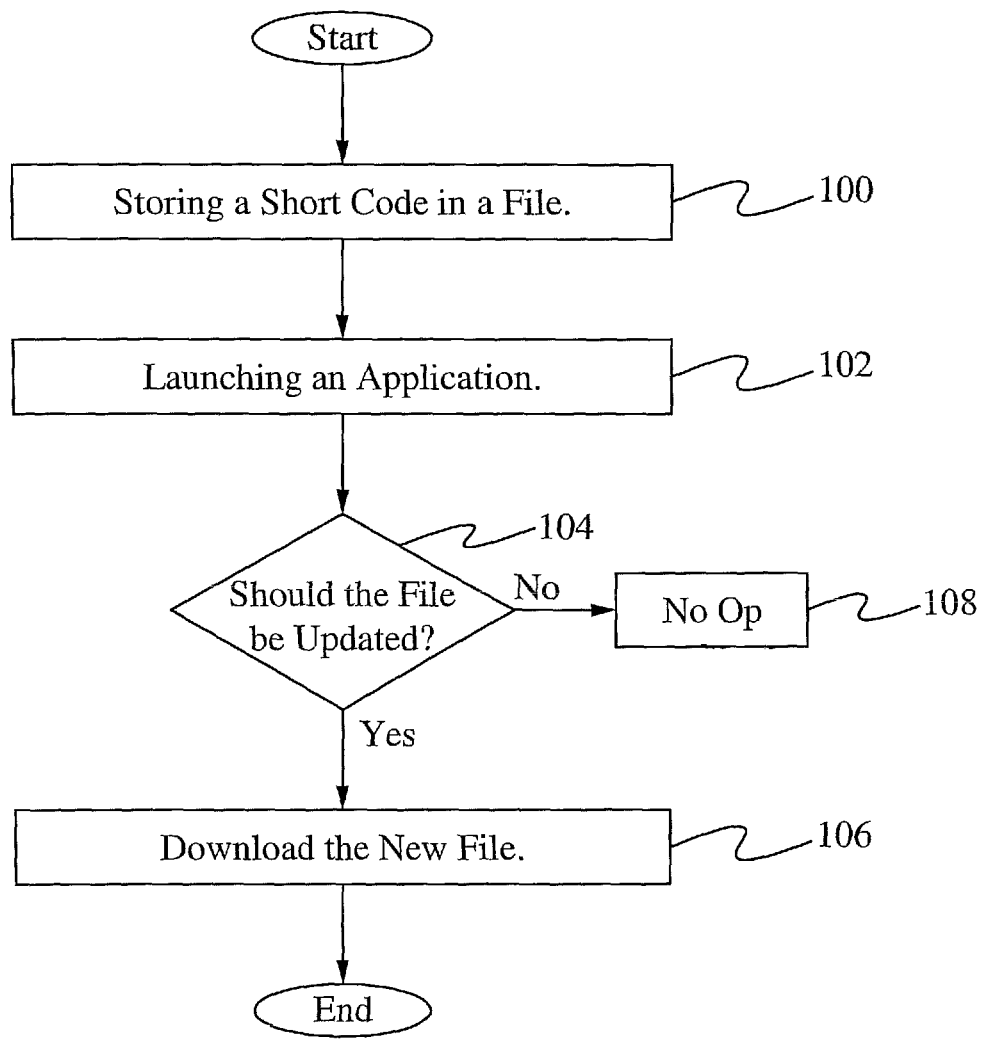
FIG. 1 illustrates a flowchart of a method of managing the entry of the destination short code such that the user does not need to input the information or verify that it is correct.

In the past, when users were utilizing a play along TV application on their mobile device, they would have to exit the application to be able to send an SMS message to participate in a contest or interactive event that corresponded to the television program. To avoid forcing a user to exit the application, instead, an improved implementation is described herein, where an application enables users to send an SMS message while the play along TV application is still running The details of the past issues and the benefits of the improved implementation are described in detail below.

Responding to a participation TV campaign via SMS typically requires a user to access the messaging function on their mobile phone, enter the SMS short code, which is the destination to which they are sending their response, and then enter the appropriate keyword, which is the response or message being sent. SMS short codes are a combination of numbers typically ranging from three to six digits. Keywords are able to include letters, numbers and words, different combinations of which represent answer choices or responses. For example, a football sports commentator might ask at-home viewers to vote on the MVP for that particular game by sending an SMS vote to short code 54321. Rather than asking the viewers to text in the name, they are able to assign each player a different letter as in a multiple choice question (e.g. A, B, C, or D). The information is typically communicated through some combination of audio and visual cues such as a graphic that overlays the on screen action. If the viewer chooses to participate, they enter the appropriate SMS short code and keyword. Since the on screen promotion is only visible for a short period of time, users are often required to remember the relevant information. Not only must they remember the information, but also input the information correctly without making a mistake. In this relatively simple example, (5-digit short code, 1 character keyword), a user will make a minimum of ten keystrokes by the time they access the SMS function, input the data and send the message.

SMS-TV programs are usually promoted on-air during a television broadcast. If a user is not watching TV when the program is promoted or only sees a second portion of the promotion, they are able to not be made aware of the program and do not have the relevant information to participate. Therefore, they will not know which programs are available to them unless they are watching TV at just the right time.

Winner Notification when Participating via a Mobile Application

SMS-TV programs are typically governed by a set of contest rules that are designed by the program's administrator. The rules outline various aspects of the contest such as the points/awards structure, eligibility restrictions and the winner notification process. For example, contest rules are able to exclude inhabitants of certain states or require winners be 18 years of age or older. Some contests require verification of a winner's eligibility before the prize is officially awarded. A potential winner is able to submit documentation providing their eligibility or speak directly with a contest administrator or by some other means. The winner notification process is typically outlined in the contest's rules. If a potential winner is selected but later found to be ineligible, an alternate potential winner is usually selected and the winner verification process is repeated. The process continues until an eligible winner is chosen. In the example of The Lucky Case Game, potential winners are selected from the pool of entries who submitted their entry either via SMS or the Web. Each potential winner is contacted via telephone at the number from which their SMS message was received or at the number entered on the Web entry form. If the user does not answer the verification call, they are skipped and the next alternate potential winner is contacted instead.

Some mobile phones do not notify users of an incoming phone call if they are using a mobile application that is coupled to the carrier network via a socket data connection. In such cases, the phone call will usually go directly to voice mail. Therefore, a potential winner of The Lucky Case Game is able to not have the opportunity to answer the winner verification phone call and loses out on a chance to win a prize.

Some Phones do not Support Sending SMS Messages from Applications

Only a subset of phones support sending messages from within an application. This capability is enabled through a phone's operating system. Furthermore, not all phones support sending SMS messages. This poses problems when a user is using a mobile application to interact with, play along with, or get additional information about a TV show with such a mobile phone and they have the opportunity to participate in an SMS-TV program. Unless the user exits the application, they will not be able to participate.

Overcoming a Difficult User Experience

Applications such as those previously described in previous filed applications provide flexibility and versatility in providing a rich user experience in allowing interacting with a television broadcast broadcast in a variety of ways described in background and in these prior filings. SMS on the other hand is virtually universal in that any cell phone is able to utilize this technology. While prior art describes sending and receiving SMS while operating an application on a cell phone, the improved method and system described herein is unique in describing how the popular SMS protocol is able to be run inside a play along TV application.

The improved implementation therefore dramatically enhances the user experience for using SMS with play along TV programs. Many mobile phones support the ability to send and receive SMS messages from within an active mobile application. By implementing a simple, streamlined user interface within a mobile application, the improved implementation overcomes the shortcomings of using a mobile device's standard SMS capabilities.

Eliminating the Need for a User to Recall the SMS Short Code

FIG. 1 illustrates a flowchart of a method of managing the entry of the destination short code such that the user does not need to input the information or verify that it is correct. The improved implementation stores the short code information in the mobile application in such a way that it is able to be changed. While some play along TV programs with an SMS component repeatedly use the same short code, others use codes that change from time to time. The ability to update the short code is also important as it provides the flexibility to participate in new SMS-TV programs that are offered after the mobile application has been installed on a device. The flexibility is achieved by storing the short code as an application accessible resource, in the step 100. The resource is able to be overwritten with an updated resource file when the application couples to a server. In the step 102, a user launches the application. Upon coupling to the server, the application automatically determines if the resource file is to be updated, in the step 104. If it is determined that the resource file is to be updated, a new file is downloaded, in the step 106; otherwise, no operation is performed, in the step 108. The new resource file contains the appropriate short codes for the SMS-TV programs currently available.

Eliminating the Need for a User to Recall the Keywords

Figure 2A:
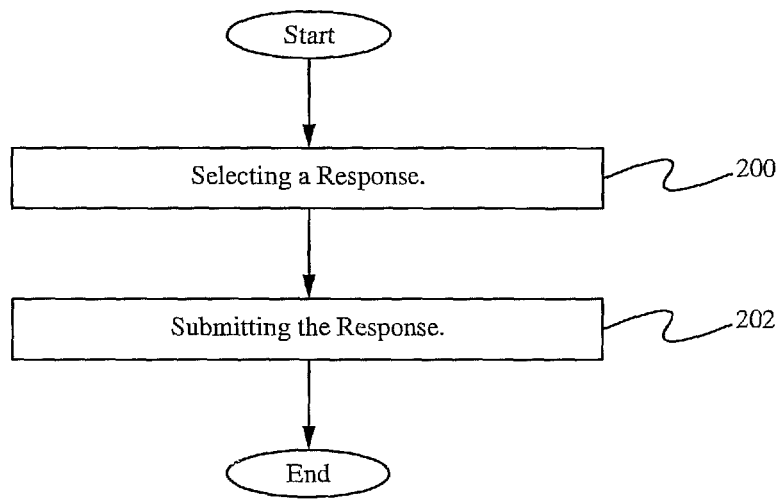
FIG. 2A-C illustrate using a rich text and graphical user interface contained in the application to present messages to users.
Figure 2B:
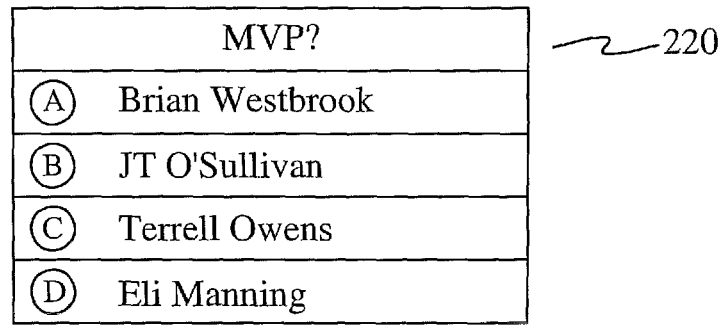
Figure 2C:
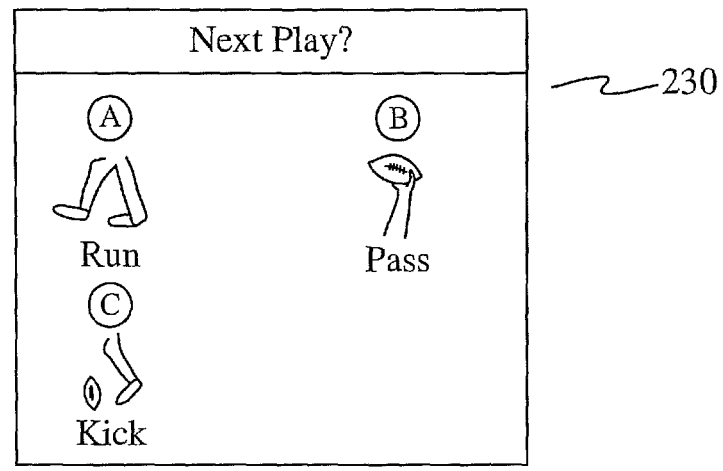

FIGS. 2A-C illustrate using a rich text and graphical user interface contained in the application to present messages to users. FIG. 2A illustrates a flowchart of a user selecting and submitting a selection or response. In the step 200, the user selects a response to a question from a list, set of icons or another form of selection. In the step 202, the response or a keyword associated with the response is submitted in an SMS to a server for receiving responses. In some embodiments, the user is not required to verify the response. FIG. 2B illustrates a list 220 of available responses that users are able to select from. FIG. 2C illustrates a set of icons 230 where a user is able to select an icon representing one of the possible choices. For example, an SMS-TV program is able to ask users to vote for the MVP of a football game by sending an SMS with the letter A, B, C and D, corresponding to four choices presented during the television broadcast. The implementation allows the players' names to be listed such that the user is able to highlight the user's name or press the corresponding letter to make their selection. Regardless of how they make their selection, the implementation enters the appropriate keyword in the SMS without requiring the user to verify that it is correct.

Reducing the Number of Keystrokes

The improved implementation is able to be integrated into applications that will be used while a user is watching TV, such as a game that is played along with a TV show broadcast. With the application already running, when the SMS-TV program is presented in the application, the user is able to submit their response with one or two keystrokes as compared to a minimum of 10 keystrokes if using the phones standard SMS messaging application.

Figure 3:
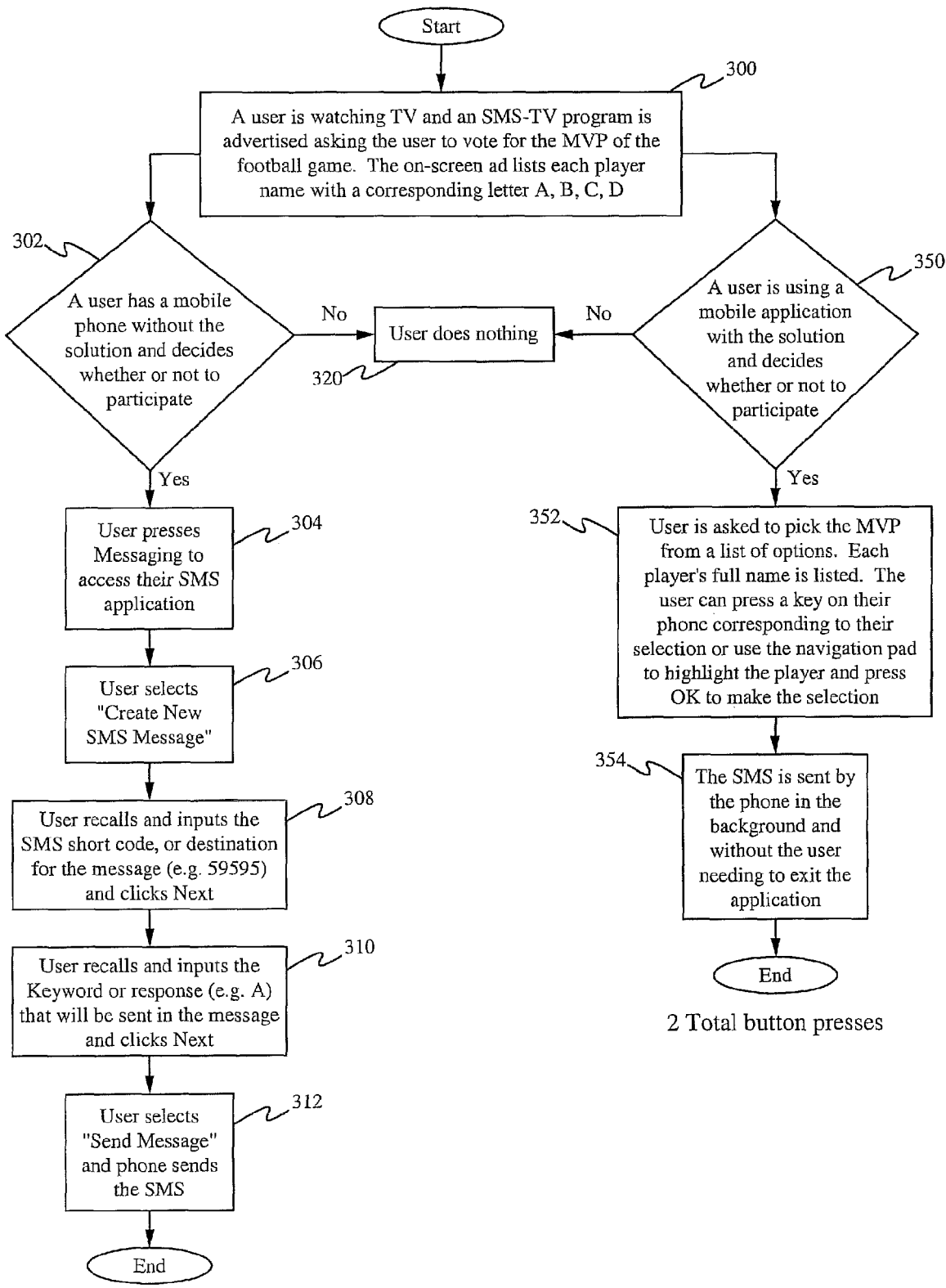
FIG. 3 illustrates an example of a flowchart comparison of a process of responding to an SMS-TV program through a regular SMS application versus through the implementation described herein.

FIG. 3 illustrates an example of a flowchart comparison of a process of responding to an SMS-TV program through a regular SMS application versus through the implementation described herein. In the step 300, a user watches television and an SMS-TV program is advertised asking the user to vote for the MVP of a football game. The on-screen advertisement lists each player with a corresponding A, B, C or D.

The regular SMS application process begins with the step 302, where a user decides whether or not to participate. If the user decides not to participate, then nothing occurs, in the step 320. If the user participates, then the user presses the appropriate button to access their SMS application, in the step 304. In the step 306, the user selects "generate new SMS message." In the step 308, the user recalls and inputs the SMS short code, or destination for the message (e.g. 59595) and clicks "Next." In the step 310, the user recalls and input the keyword or response (e.g. A) that will be sent in the message and clicks "Next." In the step 312, the user selects "Send Message" and the phone sends the SMS. This process includes a total of 11 button presses.

The process using the improved implementation described herein begins with the step 350, where a user decides whether or not to participate. If the user decides not to participate, then nothing occurs, in the step 320. If the user participates, then the user is asked to pick the MVP from a list of options or another form of selection. Each player's name is listed. The user is able to press a key on their phone corresponding to their selection or use the navigation pad to highlight the player and press "OK" to make the selection, in the step 352. In the step 354, the SMS is sent by the phone in the background and without the user needing to exit the application. This process includes a total of 2 button presses.

As will be understood by those skilled in the art, the processes are able to include slightly more or less processes, but in general, the improved implementation described herein is implemented with significantly fewer button presses than when using a standard SMS application.

In-application Promotion

The improved implementation is able to promote the SMS-TV program from within the application, which means a user does not need to be present when a program is shown on television and the relevant short code and keyword information is communicated. This benefits the user as they are able to participate in programs even if they miss seeing the on-air promotion. The improved implementation benefits programs by reducing the cost of promotion. On-air promotions of SMS-TV programs are often short due to the expense of television advertising. Through the improved implementation, an SMS-TV program is able to be promoted in the application more often than on TV or forgo on-air promotion altogether by relying solely on promotion in the application.

Storing a History of SMS-TV Program

Similar to an email inbox, the improved implementation stores a list of SMS-TV programs so that users are able to review programs they might have missed seeing on TV. One challenge of keeping a history of programs is tracking which programs are still active. Most SMS-TV programs have a deadline after which a user's entry will not be counted. The improved implementation tracks this information and differentiates between programs that are active. When viewing the history, users are able to sort programs by active and inactive programs. Active programs are listed in green text, whereas inactive programs are listed in red text. Programs in which a user has participated are highlighted in grey.

Overcoming the Winner Notification Issue

In the improved implementation described herein, sometimes a TV viewer is using a mobile application while watching a program. Since some mobile phones do not notify users of incoming phone calls while using a mobile application, a potential winner of an SMS-TV program might not be reachable via their mobile phone in cases where the contest provider verifies eligibility. The implementation described herein is to add additional information to the SMS being sent from the application in order to identify users submitting responses from such applications. The additional information is referred to as "tags." These tags are able to contain specific pieces of information which, in turn, impact the winner notification process. For example:

Alternate Phone Number

Figure 4:
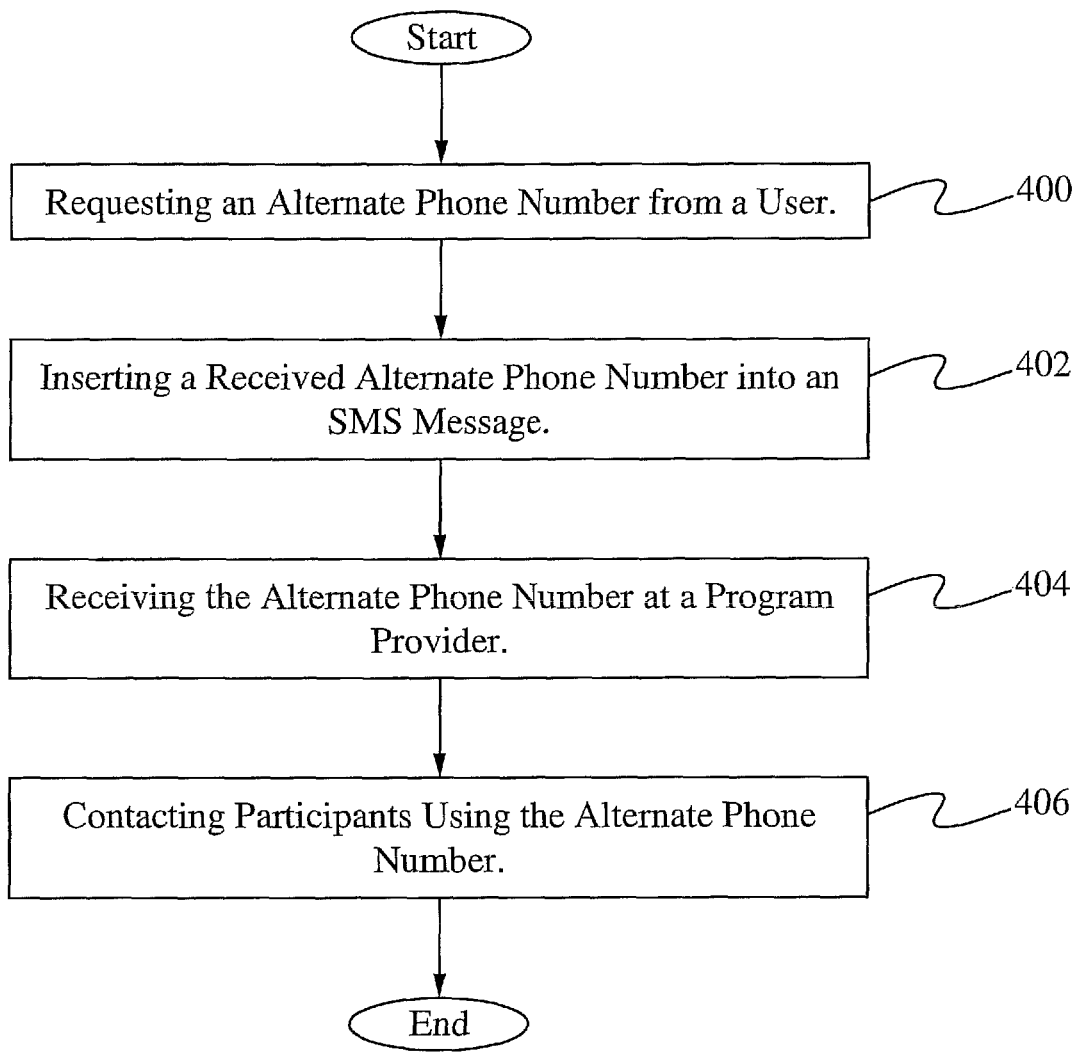
FIG. 4 illustrates a flowchart of a method of utilizing an alternate phone number for winner notification.

FIG. 4 illustrates a flowchart of a method of utilizing an alternate phone number for winner notification. When a participant is given the option to participate in an SMS-TV program from within the application, they are able to be required to provide an alternate phone number in addition to whatever other information is required by the TV program, in the step 400. The cell phone application logic inserts this alternate phone number in the SMS message that is sent to the SMS-TV program provider, in the step 402. The program provider receives the alternate phone number, in the step 404, and the alternate verification agent for the television program is instructed to contact participants at the alternate number, in the step 406. In some embodiments, the alternate number is called only after a primary number fails. In some embodiments, the alternate number is called instead of the user's cell phone number.

Service Disconnection to Allow for Phone Verification

Figure 5:
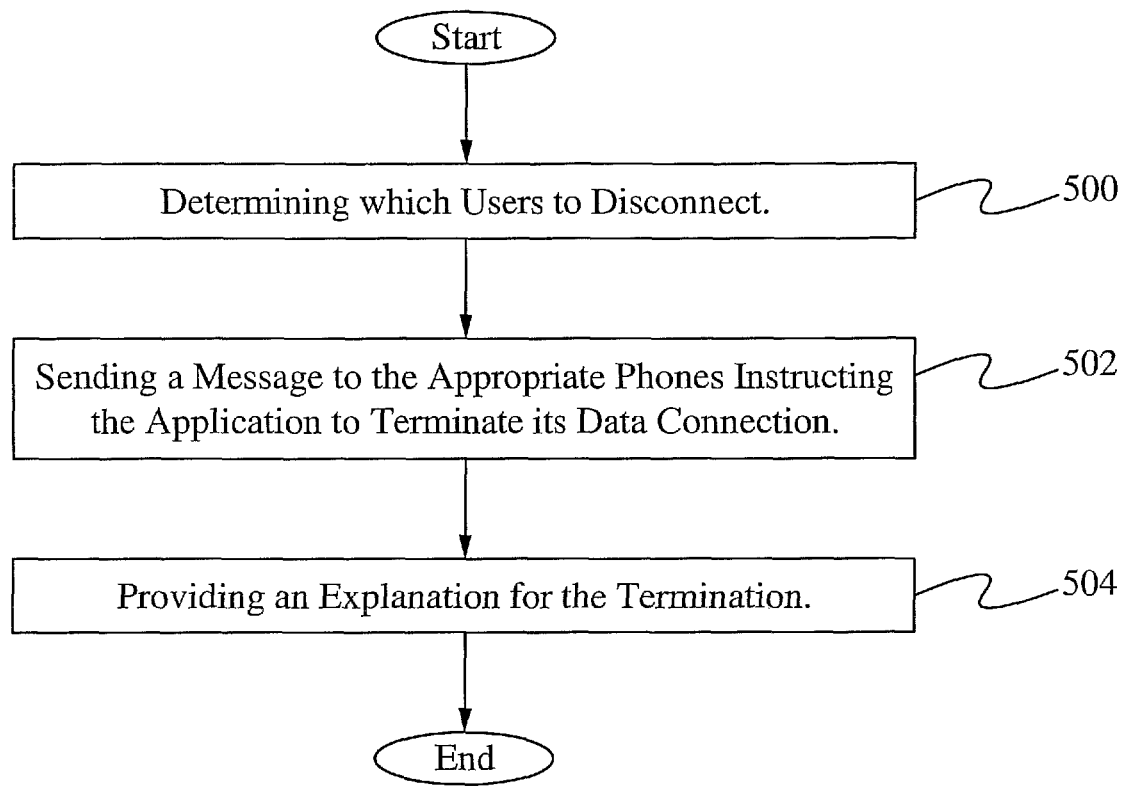
FIG. 5 illustrates a flowchart of a method of disconnecting a service to allow for phone verification.

FIG. 5 illustrates a flowchart of a method of disconnecting a service to allow for phone verification. For a large subset of mobile phones, the reason they are unable to receive phone calls while an application is running is because the application is maintaining a data connection. By disconnecting a user's data connection, they will be able to receive incoming calls. The implementation described herein provides the ability to disconnect the data connection of the application that is running Once it is determined which users to disconnect, in the step 500, the implementation sends a message to the appropriate phones instructing the application to terminate its data connection, in the step 502. In some embodiments, the data connection is terminated in another manner. Through this process, in some embodiments, users are able to be provided with an explanation as to why their connection is being terminated, in the step 504. The result is to be able to keep the user in the application, albeit without an active data connection, or to instruct the application to exit altogether. There are several options for determining which users to disconnect.

The implementation logs each entry submitted by the user. Once the winning selection (e.g. case number four) has been identified, all users are able to be disconnected who made that selection. A problem with this implementation is that a rather large subset of the users utilizing the application might be affected. For example, if the SMS-TV program asks for a user to respond to one of four options, an even distribution of responses results in 25% of the user base being disconnected.

In order to reduce the number of users affected by the data connection termination, it is optimal to only disconnect the potential winner(s) of the program. Whatever person or entity is in charge of the winner notification process is in the best position to do so. Once the user is identified, the implementation permits a third part to notify a server to terminate the connection or they are able to do it themselves through a secure interface to the server. The implementation is predicated on the use of tags in order to identify the user as having used an application with the implementation to participate. The tag is able to be in the form of a user name or some other unique identifier added by the mobile application. For example, if a user generated a user name for their account, the application is able to append the message with that information. It is important that the unique identifier be generated from the application or the server to which the application couples because the application is administered securely and without user error. Depending on the winner notification requirements, potential winners are able to be disconnected one at a time (as they are called one by one from the list of potential winners) or as part of a larger group (e.g. the top ten potential winners). In either case, the connection termination message takes place as described above.

User Identification Tags

Each SMS message is able to be tagged with a unique identifier such as a user name or handle that the user provided previously. For example, a game service asks users to have a community membership name that is used to identify them on leader-boards. While a mobile phone number is a unique identifier, it is possible that a user has not provided the service provider with the correct number. Therefore, the application will tag the SMS with a different identifier.

In-application Verification

Potential winners are able to be contacted from within the application. The same questions asked over the phone are able to be asked in a series of two-way communications with the potential winner, all through the application. Similar to how the implementation presents SMS-TV questions on the screen, winner verification questions are able to be presented and the answers are able to be tracked. For example, a user is able to be asked of their age or state of residence, or whatever other verification questions are necessary to determine eligibility. Each question is able to be asked one at a time with the appropriate answer entry method (e.g. multiple choice, free form text or drop down menu). The process does not require any phone call for verification purposes to be made, and is able to be managed by a verification agent or through an automated script. The agent is able to submit the questions to the user and based on the responses either continue with the user or move to the next user. The messages are sent by our server to the mobile handset via the data connection. The agent uses an interface or tool that allows them to select the user with whom to communicate and a method to select, send, receive and monitor messages. The process is able to take place automatically through generation of script that sends the questions and analyzes the responses on behalf of the agent. In both cases, based on the responses, the process continues until an eligible winner is found.

The in-application method described above is able to take place at various times. The implementation allows users to respond to eligibility questions before submitting an entry. Users who do not qualify are not allowed to participate. Users are able to be screened immediately after making their submission. If users are found to be ineligible, they are able to be removed from the potential pool of respondents before the SMS-TV program provider selects the winner. In this case, all members of the pool are eligible. Users are also able to be screened in real-time as described above.

Figure 6:
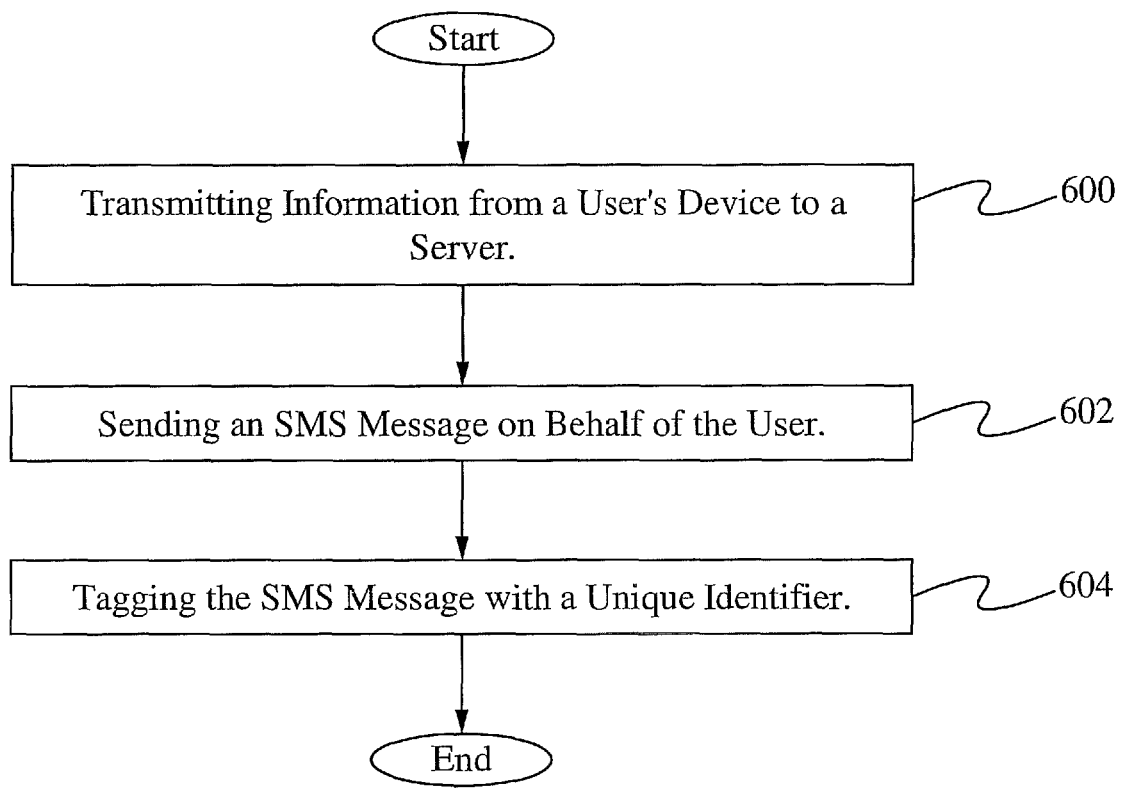
FIG. 6 illustrates a flowchart of a method of sending SMS-TV entries on behalf of users.

Sending SMS-TV Entries on Behalf of Users who have Phones that do not Allow them to do So FIG. 6 illustrates a flowchart of a method of sending SMS-TV entries on behalf of users. The improved implementation allows users to send SMS messages from an application, even if that capability is not supported on that device. Once the user indicates his response to the SMS-TV program, the information is transmitted from the device to the server via the active data connection, in the step 600. The server processes the information and sends an SMS message on behalf of the user, in the step 602. In some embodiments, the SMS message is sent to a server for utilizing the response as desired, such as determining if the response is correct. In some embodiments, the SMS message is sent to a host of the TV program. In some embodiments, the SMS message is tagged with a unique identifier for security purposes, in the step 604. When an SMS message is sent from a mobile phone, the message includes the user's phone number, which is a unique identifier for the receiver. If the message is coming from the server, however, the message is tagged with a unique identifier that differs from the user's phone number in order to notify the SMS-TV program manager that the message was sent by the server and not the user's phone number. This is important for billing and security purposes.

Figure 7:
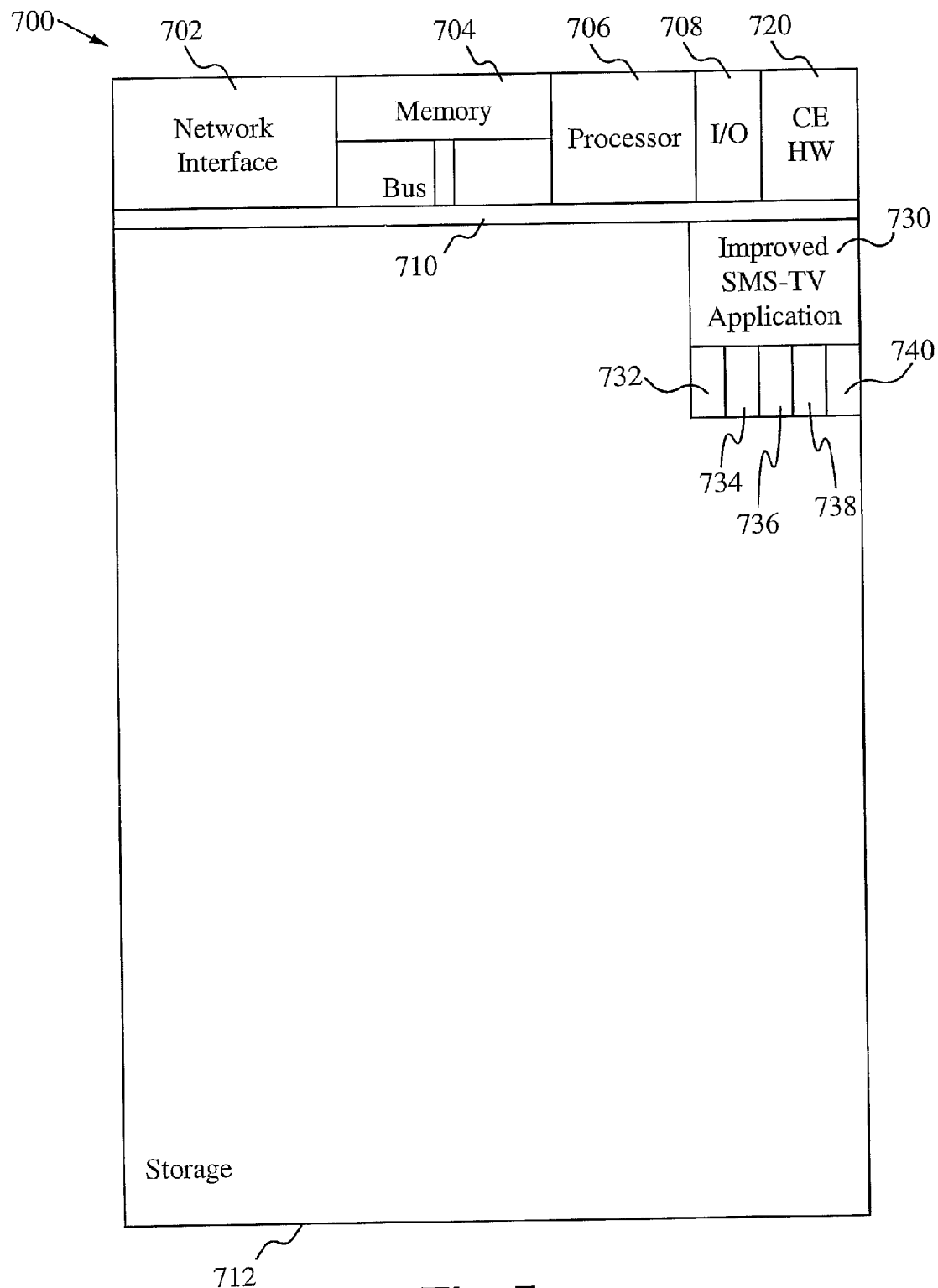
FIG. 7 illustrates a block diagram of an exemplary computing device configured to implement the improved method of participating in an SMS-TV contest.

FIG. 7 illustrates a block diagram of an exemplary computing device 700 configured to implement the improved method of participating in an SMS-TV contest. The computing device 700 is able to be used to receive and send information related to an SMS-TV contest. For example, the computing device 700 receives a question regarding a television show and a user is able to select and send a response to that question. In general, a hardware structure suitable for implementing the computing device 700 includes a network interface 702, a memory 704, a processor 706, I/O device(s) 708, a bus 710 and a storage device 712. The choice of processor is not critical as long as a suitable processor with sufficient speed is chosen. The memory 704 is able to be any conventional computer memory known in the art. The storage device 712 is able to include a hard drive, CDROM, CDRW, DVD, DVDRW, flash memory card or any other storage device. The computing device 700 is able to include one or more network interfaces 702. An example of a network interface includes a network card connected to an Ethernet or other type of LAN. The I/O device(s) 708 are able to include one or more of the following: keyboard, mouse, monitor, display, printer, modem, touchscreen, button interface and other devices. Improved SMS-TV application(s) 730 used to perform the method of participating in an SMS-TV contest are likely to be stored in the storage device 712 and memory 704 and processed as applications are typically processed. More or less components shown in FIG. 7 are able to be included in the computing device 700. In some embodiments, improved SMS-TV contest hardware 720 is included. Although the computing device 700 in FIG. 7 includes applications 730 and hardware 720 for improved SMS-TV gaming, the improved method of participating in an SMS-TV contest is able to be implemented on a computing device in hardware, firmware, software or any combination thereof.

In some embodiments, the improved SMS-TV application(s) 730 include several applications and/or modules. In some embodiments, the improved SMS-TV application(s) 730 include an improved user experience module 732, an in-application promotion module 734, a history of SMS-TV programs module 736, winner notification module 738 and an SMS-TV entry module 740. Additional or fewer modules are able to be included. Furthermore, depending on the device and its intended operation, a device is able to include some of the modules and not others. For example, in some embodiments, a server contains the winner notification module 738 to be able to appropriately contact winners of a contest, but the server does not contain the improved user experience module 732.

The improved user experience module 732 provides a better user experience by eliminating the need for a user to recall the SMS short code, eliminating the need for a user to recall keywords and reducing the number of keystrokes a user makes. The improved user experience module 732 includes an easy-to-use user interface which includes selections available in list or icon form. The improved user experience module 732 stores short code information and the capabilities of verifying and changing the short code when desired, as described above. The in-application promotion module 734 enables promoting an SMS-TV program from within the application in the case where a user is not watching television. The history of SMS-TV programs module 736 stores and presenting a list of SMS-TV programs so that users are able to review programs they might have missed seeing on television. The history of SMS-TV programs module 736 also tracks which SMS-TV programs are active and upcoming deadlines, as well as, producing the results in a user-friendly format. The winner notification module 738 provides ways of notifying a winner beyond merely calling the user's cell phone number. The winner notification module 738 includes an implementation to receive an alternate phone number that is to be called for notification. User identification tags are able to be included with each SMS message to help authenticate a user. The winner notification module 738 also includes service disconnection capabilities to allow for phone verification. The winner notification module 738 also includes in-application verification to verify winners through their mobile device. The SMS-TV entry module 740 enables users who do not have SMS capability to send SMS messages with assistance by a server. The SMS-TV entry module 740 communicates with the server and the server sends the SMS message on behalf of the contacting mobile device. The modules stored on the computing device 700 have corresponding counterparts stored on a server which provide the necessary information and updates.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

Figure 8:
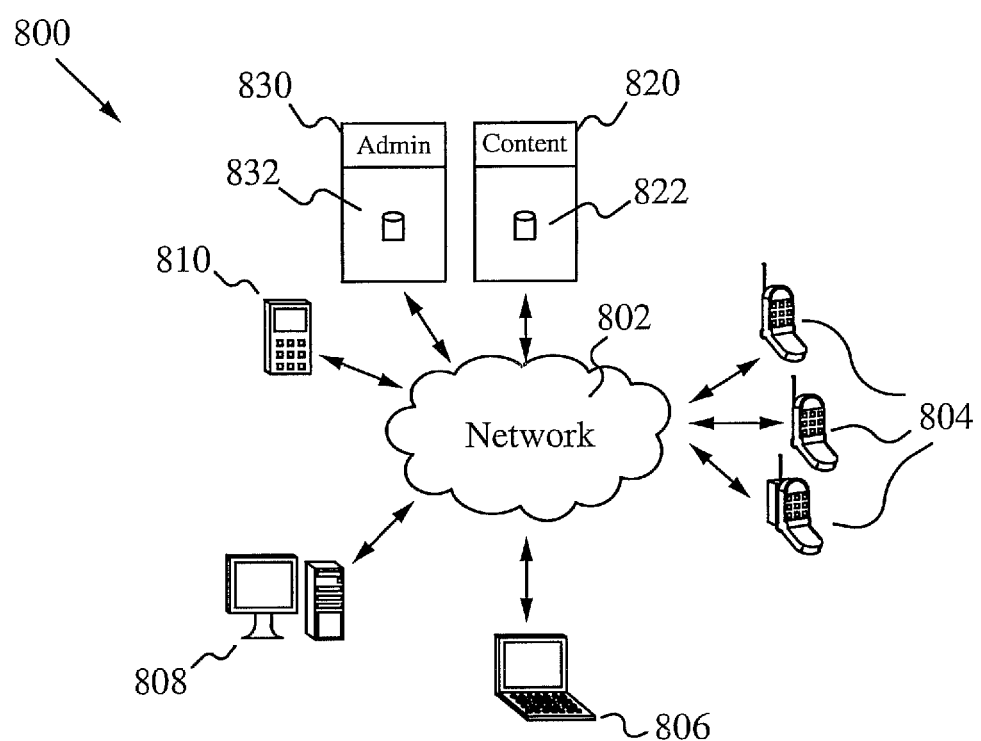
FIG. 8 illustrates a graphical representation of a network of devices.

FIG. 8 illustrates a graphical representation of a network of devices 800. A network 802 for allowing communication between devices includes either the Internet, a cellular network, other networks or any combination of networks. As described, devices that couple to the network to implement the improved method of participating in an SMS-TV game are able to be a variety of devices such as cellular phones 804, laptop computers 806, personal computers 808 and PDAs 810. In some embodiments, one or more servers are used to communicate with the devices. For example, in some embodiments, a content server 820 and an administrative server 830 are coupled with the network 802. The content server 820 includes information such as questions and answers related to a television program. In some embodiments, the content server 820 includes applications 822 to communicate the information to the devices within the network. In some embodiments, the administrative server 830 includes information 832 such as applications or updates which are downloadable to the devices. In some embodiments, the administrative server 830 also includes applications to verify users, SMS short codes, applications to communicate SMS messages on behalf of a device and perform other operations described above. In some embodiments, a single server is able to perform the tasks of the content server and the administrative server. Additionally, other servers and devices are able to be included in the network of devices 800 as desired or as necessary.

To utilize the improved method of and system for participating in SMS-TV contests, a user acquires necessary application(s) which enable the improved performance. The applications are able to be pre-installed on a device, downloaded or acquired in another manner. The user then utilizes the applications to perform desired operations such as using the user interface to efficiently make selections to respond to a question in a contest, downloading SMS short codes, promoting contests within the application, accessing a history of SMS-TV programs, submitting an alternate phone number, utilizing user identification tags, verification, contacting a server to send an SMS message on the device's behalf and other operations. On the server side, a host or other entity utilizes applications to perform desired operations as well such as promoting contests within the application, storing a history of SMS-TV programs, enabling an alternate phone number to be submitted, utilizing user identification tags, disconnecting the application to receive an incoming call, verification, sending an SMS message on the device's behalf and other operations. Some of the aforementioned operations are performed by the user specifically while others are automatically performed to provide the user with the best service possible.

In operation, the improved method of and system for participating in SMS-TV contests provides significant benefits which allow users to better enjoy such contests. SMS messaging has become a popular way for television viewers to interact with their favorite TV programs. While several companies allow the exchange of SMS messages while running a Java application or from within a WAP based application or browser, between TV viewers, the use of SMS in playing along with game show telecasts in promoted events like voting or sweepstakes events to date have been done on freestanding basis outside game specific applications, such as those referred to in U.S. patent application Ser. No. 11/495,853, filed Jul. 27, 2006 and entitled, "A LIVE TELEVISION SHOW UTILIZING REAL TIME INPUT FROM THE VIEWING AUDIENCE," which is incorporated by reference herein. As described above, the improved method of participating in SMS-TV contests provides methodologies for controlling SMS capabilities for viewers and TV programmers and utilizing the richer and more sophisticated game experience enabled by the improved applications.

In some embodiments, the improved implementation described herein is able to be incorporated within another application such as a play along TV application. For example, an application for playing along with a television program allows users to make several predictions about the program while watching the program on television. By incorporating the SMS-TV functionality, the play along TV application is able to provide an improved user experience for a user to participate in the SMS-TV program or contest. As described above, other capabilities are able to be included as well such as providing an alternate phone number, disconnecting the play along TV application to allow the user to receive a winner's notification phone call, receiving a notification inside the application that the user has won a contest and so on. By including the SMS-TV capabilities of the improved implementation, play along TV applications are able to support both their own interactive experience along with the SMS-TV program/contest without requiring the user to exit the application, and at the same time also improving the user interface and overall user experience.

Additional examples of applications the improved implementation is able to be incorporated with are any of the applications described in U.S. patent application Ser. No. 11/166,596, filed Jun. 24, 2005 and entitled, "METHODS AND APPARATUS FOR DISTRIBUTED GAMING OVER A MOBILE DEVICE," U.S. patent application Ser. No. 11/167,025, filed Jun. 24, 2005 and entitled, "METHODS AND APPARATUS FOR DISTRIBUTED GAMING OVER A MOBILE DEVICE," U.S. patent application Ser. No. 11/298,901, and entitled, "A GAME OF SKILL PLAYED BY REMOTE PARTICIPANTS UTILIZING WIRELESS DEVICES IN CONNECTION WITH A COMMON GAME EVENT," U.S. patent application Ser. No. 11/495,853, filed Jul. 27, 2006 and entitled, "A LIVE TELEVISION SHOW UTILIZING REAL TIME INPUT FROM THE VIEWING AUDIENCE" or U.S. patent application Ser. No. 11/542,335, filed on Oct. 2, 2006 and entitled, "CELLULAR PHONE GAMES BASED UPON TELEVISION ARCHIVES" which are all incorporated by reference herein. The improved implementation described herein is able to be incorporated within other applications as well.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method implemented on a computing device of providing an improved user experience when participating in a contest comprising:
   a. implementing an application containing a user interface;
   b. presenting content related to the contest to a user with the application through the user interface; and
   c. contest enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated.

2. The method of claim 1 wherein the user interface includes at least one of a list or a set of icons.

3. The method of claim 2 wherein a user submits a response by highlighting and selecting a choice from the list or the set of icons.

4. The method of claim 1 further comprising storing a history of contest programs wherein the history of contest programs enables a user to review missed programs.

5. The method of claim 1 further comprising notifying a winner of the contest.

6. The method of claim 5 wherein notifying the winner comprises contacting an alternate phone number that is different than the number from which the data message was sent, and further wherein the alternate phone number is embedded in an SMS message.

7. The method of claim 1 further comprising disconnecting a data connection of the application to allow incoming calls.

8. The method of claim 7 wherein disconnecting a data connection comprises:
   a. determining which applications to disconnect;
   b. sending a message to the applications to terminate the data connection; and
   c. providing an explanation to users of the disconnected applications.

9. The method of claim 8 wherein determining which applications to disconnect comprises disconnecting applications of the users who made a correct selection.

10. The method of claim 8 wherein determining which applications to disconnect comprises disconnecting applications of the users who are potential winners.

11. The method of claim 1 further comprising verifying qualifications of the winner through the application.

12. The method of claim 11 wherein verifying qualifications occurs before the contest begins.

13. The method of claim 1 further comprising sending a data message on behalf of a user utilizing the application and a server.

14. The method of claim 13 wherein the data message is tagged with a unique identifier indicating that the data message did not come directly from the computing device.

15. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

16. A system implemented on a computing device for providing an improved user experience when participating in contest comprising:
   a. a server; and
   b. a device coupled to the server, the device containing an application configured for:
      i. implementing a user interface;
      ii. presenting content related to the contest to a user with the application through the user interface; and
      iii. enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated.

17. The system of claim 16 wherein the user interface includes at least one of a list or a set of icons.

18. The system of claim 17 wherein a user submits a response by highlighting and selecting a choice from the list or the set of icons.

19. The system of claim 16 wherein the application is further configured for storing a history of contest programs wherein the history of contest programs enables a user to review missed programs.

20. The system of claim 16 further comprising notifying a winner of the contest.

21. The system of claim 20 wherein notifying the winner comprises contacting an alternate phone number that is different than the number from which the data message was sent, and further wherein the alternate phone number is embedded in an SMS message.

22. The system of claim 16 wherein the application is further configured for disconnecting a data connection of the application to allow incoming calls.

23. The system of claim 22 wherein disconnecting a data connection comprises:
   a. determining which applications to disconnect;
   b. sending a message to the applications to terminate the data connection; and
   c. providing an explanation to users of the disconnected applications.

24. The system of claim 23 wherein determining which applications to disconnect comprises disconnecting applications of the users who made a correct selection.

25. The system of claim 23 wherein determining which applications to disconnect comprises disconnecting applications of the users who are potential winners.

26. The system of claim 16 wherein the application is further configured for verifying qualifications of the winner.

27. The system of claim 26 wherein verifying qualifications occurs before the contest begins.

28. The system of claim 16 wherein the application is further configured for sending a data message on behalf of a user utilizing a server.

29. The system of claim 28 wherein the data message is tagged with a unique identifier indicating that the data message did not come directly from the computing device.

30. The system of claim 16 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

31. A system implemented on a computing device, the system comprising:
   a. a memory for storing an application, the application comprising:
      i. a user interface;
      an for presenting content related to a contest to a user and enabling the user to submit a data message response to the contest, wherein the application submits the data message response using a data message short code which is updatable and stored as an application accessible resource, wherein the application accessible resource is overwritten by an updated resource file which is downloaded when the application couples to a server and after the application determines if the application accessible resource should be updated and presenting a list of television programs that have been previously aired on television; and a processor for processing the application.

32. The system of claim 31 further comprising a data message entry module, the data message entry module configured for communicating with a server to send a data message.

33. The system of claim 31 wherein the application further comprises notifying a winner of the contest and disconnecting a data connection of the application to allow incoming calls.

34. The system of claim 33 wherein the application further comprises verifying qualifications of the winner.

35. The system of claim 31 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

36. A device comprising:
   a. a memory for storing an application, the application configured for:
      i. implementing a user interface;
      ii. (SMS-TV) presenting content related to a contest to a user with the application through the user interface; and
      iii. enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and
   b. a processing component coupled to the memory, the processing component configured for processing the application.

37. The device of claim 36 wherein the user interface includes at least one of a list or a set of icons.

38. The device of claim 37 wherein a user submits a response by highlighting and selecting a choice from the list or the set of icons.

39. The device of claim 36 wherein the application is further configured for notifying a winner of the contest.

40. The device of claim 39 wherein notifying the winner comprises verifying qualifications of the winner.

41. The device of claim 36 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

42. A server device comprising:
   a. a memory for storing an application, the application configured for:
      i. presenting content related to contests through a user-side application;
      ii. storing a list of contest programs to be presented on a user device; and
      iii. contest receiving a data message response from the user-side application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and b. a processing component coupled to the memory, the processing component configured for processing the application.

43. The server device of claim 42 further comprising notifying a winner of the contest.

44. The server device of claim 43 wherein notifying a winner comprises disconnecting the user-side application so that the user device is able receive an incoming call.

45. The server device of claim 42 wherein the application is further configured for verifying user credentials.

46. The server device of claim 42 wherein the application is further configured for sending a data message on the user device's behalf.

47. A network of devices comprising:
a. at least one server;
b. a plurality of mobile devices, each of the plurality of mobile devices containing an application configured for:
i. implementing a user interface;
ii. presenting content related to a contest to a user with the application through the user interface; and
iii. enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and
c. a network for coupling the at least one server and the plurality of mobile devices.

48. A method implemented on a computing device of providing an improved user experience when participating in a game comprising:
a. implementing an application containing a user interface;
b. presenting content related to the game to a user with the application through the user interface; and
c. enabling the user to submit a data message response to the game without closing the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated.

49. The method of claim 48 wherein the data message response is sent by the computing device in the background.

50. The method of claim 48 wherein the game is a television game comprising a question related to a television broadcast.

51. The method of claim 50 wherein the television broadcast and the application are synchronized.

52. The method of claim 48 further comprising presenting results.

* * * * *

UNITED STATES PATENT AND TRADEMARK OFFICE
CERTIFICATE OF CORRECTION

| | | |
|---|---|---|
| PATENT NO. | : 8,935,715 B2 | Page 1 of 4 |
| APPLICATION NO. | : 14/274706 | |
| DATED | : January 13, 2015 | |
| INVENTOR(S) | : Michael Cibula, Mark K. Berner and David B. Lockton | |

It is certified that error appears in the above-identified patent and that said Letters Patent is hereby corrected as shown below:

<u>IN THE CLAIM SECTION - U.S. PATENT DOCUMENTS - Claim 1</u>

Replace -- 1. A method implemented on a computing device of providing an improved user experience when participating in a contest comprising:
    a. implementing an application containing a user interface;
    b. presenting content related to the contest to a user with the application through the user interface; and
    c. ~~contest~~ enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated. -- with

<u>1. A method implemented on a computing device of providing an improved user experience when participating in a contest comprising:</u>
    <u>a. implementing an application containing a user interface;</u>
    <u>b. presenting content related to the contest to a user with the application through the user interface; and</u>
    <u>c. enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the</u>

Signed and Sealed this
Fifteenth Day of September, 2015

Michelle K. Lee
*Director of the United States Patent and Trademark Office*

CERTIFICATE OF CORRECTION (continued)

U.S. Pat. No. 8,935,715 B2 application determines if the application accessible resource should be updated.

IN THE CLAIM SECTION - U.S. PATENT DOCUMENTS - Claim 31

Replace -- 31. A system implemented on a computing device, the system comprising:
a. a memory for storing an application, the application comprising:
i. a user interface; ~~an~~ for presenting content related to a contest to a user and enabling the user to submit a data message response to the contest, wherein the application submits the data message response using a data message short code which is updatable and stored as an application accessible resource, wherein the application accessible resource is overwritten by an updated resource file which is downloaded when the application couples to a server and after the application determines if the application accessible resource should be updated and for presenting a list of television programs that have been previously aired on television; and a processor for processing the application. -- with

31. A system implemented on a computing device, the system comprising:
a. a memory for storing an application, the application comprising:
i. a user interface for presenting content related to a contest to a user and enabling the user to submit a data message response to the contest, wherein the application submits the data message response using a data message short code which is updatable and stored as an application accessible resource, wherein the application accessible resource is overwritten by an updated resource file which is downloaded when the application couples to a server and after the application determines if the application accessible resource should be updated and for presenting a list of television programs that have been previously aired on television; and a processor for processing the application.

IN THE CLAIM SECTION - U.S. PATENT DOCUMENTS - Claim 36

Replace -- 36. A device comprising:
a. a memory for storing an application, the application configured for:
i. implementing a user interface;
ii. ~~(SMS-TV)~~ presenting content related to a contest to a user with the application through the user interface; and
iii. enabling the user to submit a data message response to the contest through interacting with the user interface of the application, wherein the application submits the data message response using a data message short code which is

CERTIFICATE OF CORRECTION (continued)
U.S. Pat. No. 8,935,715 B2 with updatable and stored as an application accessible resource, wherein the application accessible resource is overwritten by an updated resource file which is downloaded when the application couples to a server and after the application determines if the application accessible resource should be updated; and
   b. a processing component coupled to the memory, the processing component configured for processing the application. --

<u>36. A device comprising:</u>
   <u>a. a memory for storing an application, the application configured for:</u>
      <u>i. implementing a user interface;</u>
      <u>ii. presenting content related to a contest to a user with the application through the user interface; and</u>
      <u>iii. enabling the user to submit a data message response to the contest through interacting with the user interface of the application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and</u>
   <u>b. a processing component coupled to the memory, the processing component configured for processing the application.</u>

<u>IN THE CLAIM SECTION - U.S. PATENT DOCUMENTS - Claim 42</u>
   Replace    -- 42. A server device comprising:
      a. a memory for storing an application, the application configured for:
         i. presenting content related to contests through a user-side application;
         ii. storing a list of contest programs to be presented on a user device; and
         iii. ~~contest~~ receiving a data message response from the user-side application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and

CERTIFICATE OF CORRECTION (continued)

U.S. Pat. No. 8,935,715 B2 b. a processing component coupled to the memory, the processing component configured for processing the application. -- with

<u>42. A server device comprising:</u>

<u>a. a memory for storing an application, the application configured for:</u>

<u>i. presenting content related to contests through a user-side application;</u>

<u>ii. storing a list of contest programs to be presented on a user device; and</u>

<u>iii. receiving a data message response from the user-side application, wherein the application submits the data message response using a data message short code which is updatable and stored as an application accessible resource, wherein the application accessible resource is overwritten by an updated resource file which is downloaded when the application couples to a server and after the application determines if the application accessible resource should be updated; and</u>

<u>b. a processing component coupled to the memory, the processing component configured for processing the application.</u>